US006616082B2

(12) United States Patent
Burch

(10) Patent No.: US 6,616,082 B2
(45) Date of Patent: Sep. 9, 2003

(54) MACHINE FOR WINDING DYNAMO-ELECTRIC STATORS

(75) Inventor: Jerry C. Burch, Northridge, CA (US)

(73) Assignee: Globe Motors, Inc., Dayton, OH (US)

( * ) Notice: Subject to any disclaimer, the term of this patent is extended or adjusted under 35 U.S.C. 154(b) by 0 days.

(21) Appl. No.: 09/978,492

(22) Filed: Oct. 16, 2001

(65) Prior Publication Data

US 2002/0060264 A1 May 23, 2002

Related U.S. Application Data

(60) Provisional application No. 60/240,647, filed on Oct. 16, 2000.

(51) Int. Cl.$^7$ ............................................. H02K 15/085
(52) U.S. Cl. ................................. 242/432.4; 242/432.6
(58) Field of Search ........................ 242/432.3, 432.4, 242/432.5, 432.6; 29/605

(56) References Cited

U.S. PATENT DOCUMENTS

| 2,506,173 A | 5/1950 | Polard |
| 2,632,602 A | 3/1953 | Weis |
| 2,998,937 A | 9/1961 | Potter et al. |
| 3,081,043 A | 3/1963 | Morrill |
| 3,184,173 A | 5/1965 | Walling |
| 3,323,734 A | 6/1967 | Peters |
| 3,334,825 A | 8/1967 | Friedrich |
| 3,338,526 A | 8/1967 | Shaff et al. |
| 3,389,865 A | 6/1968 | Stuckey |
| 3,493,186 A | 2/1970 | Arick |
| 3,524,600 A | 8/1970 | Peters |
| 3,539,121 A | 11/1970 | Peters |
| 3,629,925 A | 12/1971 | Brown, Jr. et al. |
| 3,716,199 A | 2/1973 | Ericson |
| 3,753,282 A | 8/1973 | Wiehl |
| 3,822,830 A | 7/1974 | Peters |
| 3,841,133 A | 10/1974 | Rice, Jr. |
| 3,856,221 A | 12/1974 | Arick et al. |
| 3,903,593 A | 9/1975 | Mason |
| 3,903,933 A | 9/1975 | Arick et al. |
| 3,913,373 A | 10/1975 | Kindig |
| 3,985,163 A | 10/1976 | Vogel et al. |
| 3,985,164 A | 10/1976 | Grawcock |
| 3,995,785 A | 12/1976 | Arick et al. |
| 4,033,385 A | 7/1977 | Taube |
| 4,051,595 A | 10/1977 | Bale |
| 4,053,111 A | 10/1977 | Eminger |
| 4,106,189 A | 8/1978 | Peters |
| 4,290,190 A | 9/1981 | Arnold |
| 4,498,636 A | 2/1985 | Boesewetter et al. |

(List continued on next page.)

FOREIGN PATENT DOCUMENTS

| GB | 2 115 447 A | 9/1983 |
| JP | 60-16160 A | 1/1985 |

Primary Examiner—Kathy Matecki
Assistant Examiner—Evan H Langdon
(74) Attorney, Agent, or Firm—Stevens & Showalter LLP

(57) ABSTRACT

An apparatus for forming wire coils on a stator including a winding tool movable in reciprocating and rotating movement and including wire apertures for feeding wire into slots of a stator. A drifting tool is provided adjacent an end of the winding tool and includes drifting blades extending radially outwardly for positioning within the slots of the stator. The drifting tool is movable with the winding tool during the winding operation such that the drifting tool follows the winding tool in its reciprocating movement to provide for displacement of wire in the slots and improve the slot fill during the winding operation. Wire retaining structures are provided above and below the stator to intermittently engage and retain wire located at the ends of the stator. A wire feed mechanism is also provided including a wire feed pulley and a belt cooperating with the pulley to push wire toward the winding tool. The wire feed pulley includes a groove, and a wire exit member is provided cooperating with the groove to engage with ends of wire located in the groove and direct the wire into a passage extending to the winding tool.

20 Claims, 16 Drawing Sheets

U.S. PATENT DOCUMENTS

| | | | |
|---|---|---|---|
| 4,588,143 A | 5/1986 | Hetzel | |
| 4,723,354 A | * 2/1988 | Moser | 242/432.2 |
| 4,724,604 A | 2/1988 | Kawazoe et al. | |
| 4,880,173 A | 11/1989 | Lachey | |
| 5,056,212 A | 10/1991 | Scherer | |
| 5,113,573 A | 5/1992 | Taji et al. | |
| 5,134,769 A | 8/1992 | Scherer | |
| 5,186,405 A | 2/1993 | Beakes et al. | |
| 5,218,752 A | 6/1993 | Hensel et al. | |
| 5,235,738 A | 8/1993 | Eminger | |
| 5,273,223 A | 12/1993 | Tsugawa | |
| 5,316,227 A | 5/1994 | Oohashi et al. | |
| 5,383,618 A | 1/1995 | Santandrea et al. | |
| 5,528,822 A | 6/1996 | Ponzio et al. | |
| 5,549,253 A | 8/1996 | Beakes et al. | |
| 5,594,984 A | 1/1997 | Kieffer et al. | |
| 5,622,332 A | * 4/1997 | Bennitt et al. | 242/432.4 |
| 5,657,530 A | 8/1997 | Kawamura et al. | |
| 5,664,317 A | 9/1997 | Ponzio et al. | |
| 5,732,900 A | 3/1998 | Burch | |
| 5,964,429 A | * 10/1999 | Burch et al. | 242/432.2 |
| 6,161,274 A | * 12/2000 | Stark et al. | 29/596 |
| 6,206,319 B1 | * 3/2001 | Burch | 242/432.4 |
| 6,254,027 B1 | * 7/2001 | Kunou | 242/432.4 |

* cited by examiner

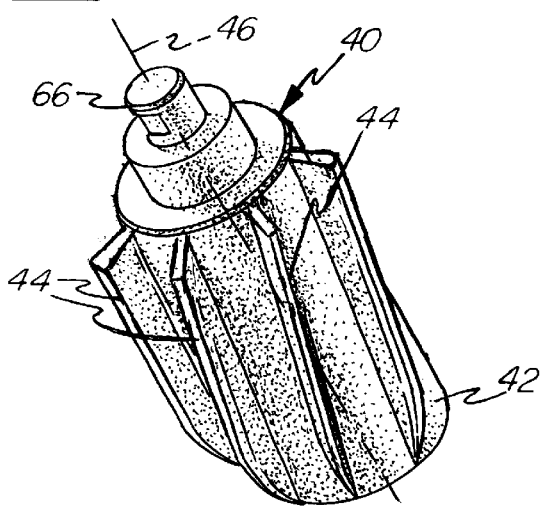
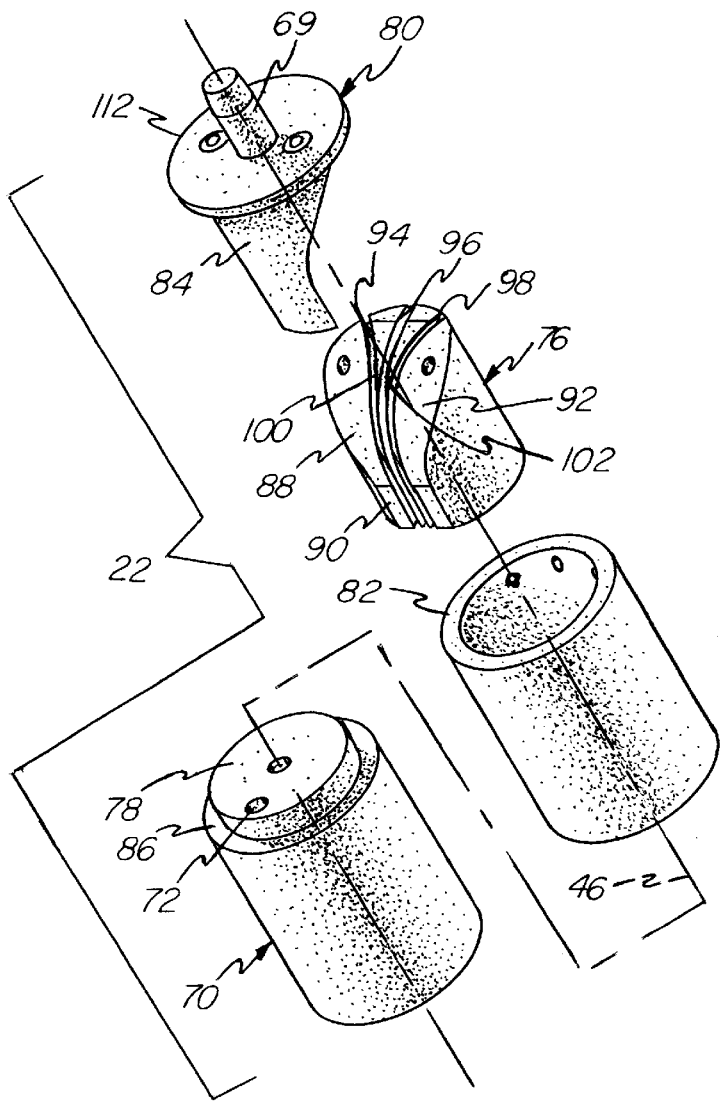

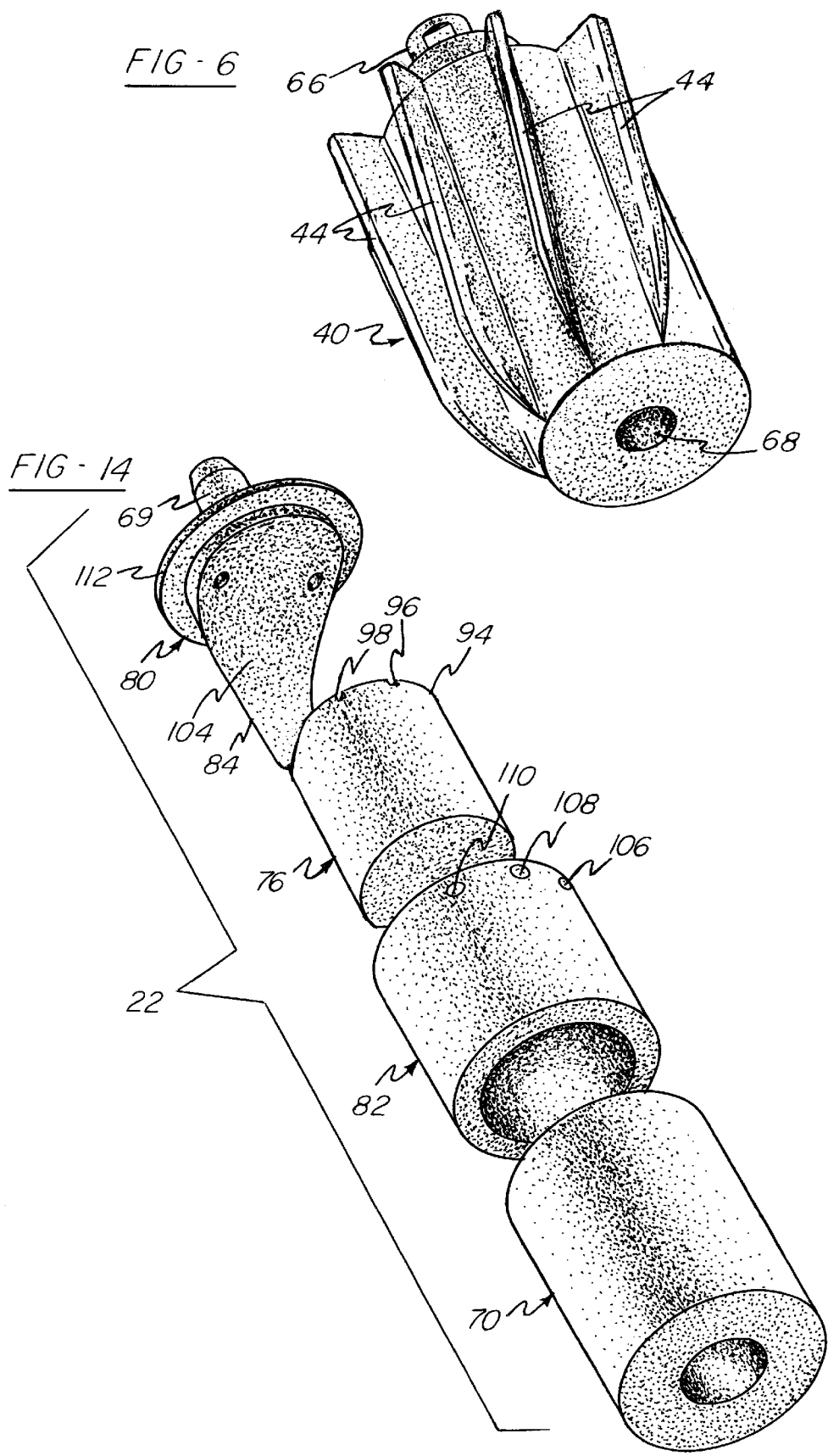

MACHINE FOR WINDING DYNAMO-ELECTRIC STATORS

CROSS REFERENCE TO RELATED APPLICATION

The benefit of prior U.S. Provisional Application No. 60/240,647 filed Oct. 16, 2000 is hereby claimed.

BACKGROUND OF THE INVENTION

1. Field of the Invention

The present invention relates generally to stator winding and, more particularly, to an apparatus and method for forming wound coils on stators for dynamo-electric machines, including an improved drifting tool for displacing wire located in stator slots during the winding operation.

2. Description of the Prior Art

Field winding coils for stators are generally placed on the radially inwardly extending teeth of a stator by either preforming the coils and then pressing the preformed coils over the stator teeth, or by winding the coils directly onto the stator teeth. In the process where the coils are preformed, the coils are pushed onto the stator by a coil pusher which forcibly pushes the coils over the teeth of the stator, and a forming tool, or forming tools, may be provided to shape the wire in the stator slots and around the ends of the teeth in order to compactly position the coils on the stator. In such a construction, excess wire must be provided for the preformed coils in order to accommodate the necessary distortions of the coils as they are pressed over and around the stator teeth. Accordingly, such a construction has been found to provide an inefficient amount of wire, as well as result in a larger stator dimension as a result of the excess coil wire extending around the end faces of the teeth for the stator.

In the alternative construction for field winding, wire is fed from a winding spindle or tool directly onto a stator wherein the wire is successively wound around the stator teeth, and the efficiency of the winding operation is substantially dependent upon the ability to direct the wire to desired locations on the teeth as it is fed from the winding spindle. Such a device for feeding wire onto the stator to form the coils directly thereon is disclosed in U.S. Pat. No. 5,964,429, which discloses a winding tool which is supported for reciprocating and rotating movement relative to a stator. The winding tool includes a plurality of forming racks which are adapted to move radially outwardly from the winding tool in order to press the end portions of the coil windings radially outwardly and thereby facilitate placement of additional wire within the slots of the stator.

When the wire being wound into the stator slots is of a relatively thick gauge, such as in the range of 15 gauge wire, particular problems arise in the feeding and formation of wire coils on the teeth of the stator. In particular, such thick gauge wire does not typically readily conform to the contour of the slot such that the slot fill provided by thick gauge wire may be reduced relative to thinner more flexible gauges of wire.

Further, unique problems relating to feeding of the wire arise with thicker gauges of wire in that such wire is subject to cold working and/or kinking, both of which may adversely affect the character of the coil windings for the stator.

SUMMARY OF THE INVENTION

The present invention provides an apparatus and method for winding wire into the slots of a stator, and in particular provides a method and apparatus which effectively feeds thicker gauge wire to desired locations on the stator to thereby form field coils, and to provide such field coils to the stator with higher slot fills as compared to prior art methods and apparatus.

In one aspect of the invention, an apparatus is provided for forming field coils on a stator for a dynamo-electric machine wherein the apparatus includes a stator mount for supporting a stator, a winding tool supported for reciprocating movement relative to the stator mount and including a wire feed passage for feeding wire into the slots of the stator, a drifting tool located adjacent a longitudinal end of the winding tool and supported for reciprocating movement with the winding tool. The drifting tool includes at least one drifting blade extending radially outwardly for passing through a slot in the stator supported in the stator mount whereby the drifting blade engages wire in the stator slot to thereby displace the wire within the slot and provide clearance for additional wires on successive passes of the winding tool through the stator as well as to ensure that the wires comprising completed coils are compactly formed.

In another aspect of the invention, an upper wire retainer is provided and is supported for movement toward and away from the upper end of the stator to engage cross-over wires extending between coils formed on the stator. The upper wire retainer includes a finger structure extending radially inwardly and terminating in downwardly extending tangs which are configured to be located overhanging the radial outer edge of the stator slots.

A lower wire clamp is also provided located on the winding tool beneath the stator. The lower wire clamp includes a clamp member which is slidably movable relative to the winding tool and which is spring biased toward the lower end of the stator. The lower wire clamp engages the lower end turns of wire coils on the stator in response to upward movement of the winding tool to hold the end turns from displacing radially inwardly toward the center of the stator.

In a further aspect of the invention, the winding tool is formed of a plurality of winding tool parts including a wire guide base, a wire guide cap cooperating with the wire guide base to form passages for wire to pass through the winding tool, and a cylindrical winding tool sleeve surrounding the wire guide base and wire guide cap. The winding tool sleeve includes wire exit apertures for feeding wire from the winding tool radially outwardly into the slots of the stator.

The wire guide base and wire guide cap define a portion of a wire feed passage passing through the winding tool, and in particular define a plurality of downstream, branch passages extending from an upstream, main passage of the wire feed passage. The branch passages each guide an individual wire from the main passage to a wire exit aperture on the winding tool sleeve. The branch passages are separated from each other by passage walls and the passage walls have a thickness, at an interface between the main passage and the branch passages, which is less than the width of the branch passages. Wires passing through the main passage toward the branch passages are separated from each other at the interface between the main passage and the branch passages whereby the leading ends of the wires are automatically directed to a respective branch passage as they pass from the main passage. Accordingly, the wire guide base and wire guide cap form a structure for facilitating self threading of the wire through the winding tool.

In a further aspect of the invention, a wire feed mechanism is provided for feeding wire to the wire feed passage.

The wire feed mechanism comprises a wire feed plate including a drive belt and a wire drive pulley in engagement with the drive belt wherein the wire drive pulley includes a groove for receiving wire therein to thereby maintain the wire in engagement with a predetermined portion of an outer surface of the wire drive pulley. A wire exit member is provided at a pick-up point along the wire drive pulley and includes a wire pick-up lip extending into the groove for engaging wire located therein and directing the wire toward the wire feed passage. Accordingly, the wire exit member provides a mechanism for self threading the wire fed from the wire feed plate into the wire feed passage, and it can therefore be seen that the apparatus of the invention provides for self threading of the wire through the apparatus from the wire feed mechanism through to the wire exit apertures on the exterior of the winding tool.

Other aspects of the invention will be apparent from the following description, the accompanying drawings and the appended claims.

BRIEF DESCRIPTION OF THE DRAWINGS

FIG. 5 is a top perspective view of the drifting tool;

FIG. 6 is a bottom perspective view of the drifting tool;

FIG. 13 is a top perspective, exploded view of the winding tool;

FIG. 14 is a bottom perspective, exploded view of the winding tool;

DETAILED DESCRIPTION OF THE PREFERRED EMBODIMENT

Figure 1:
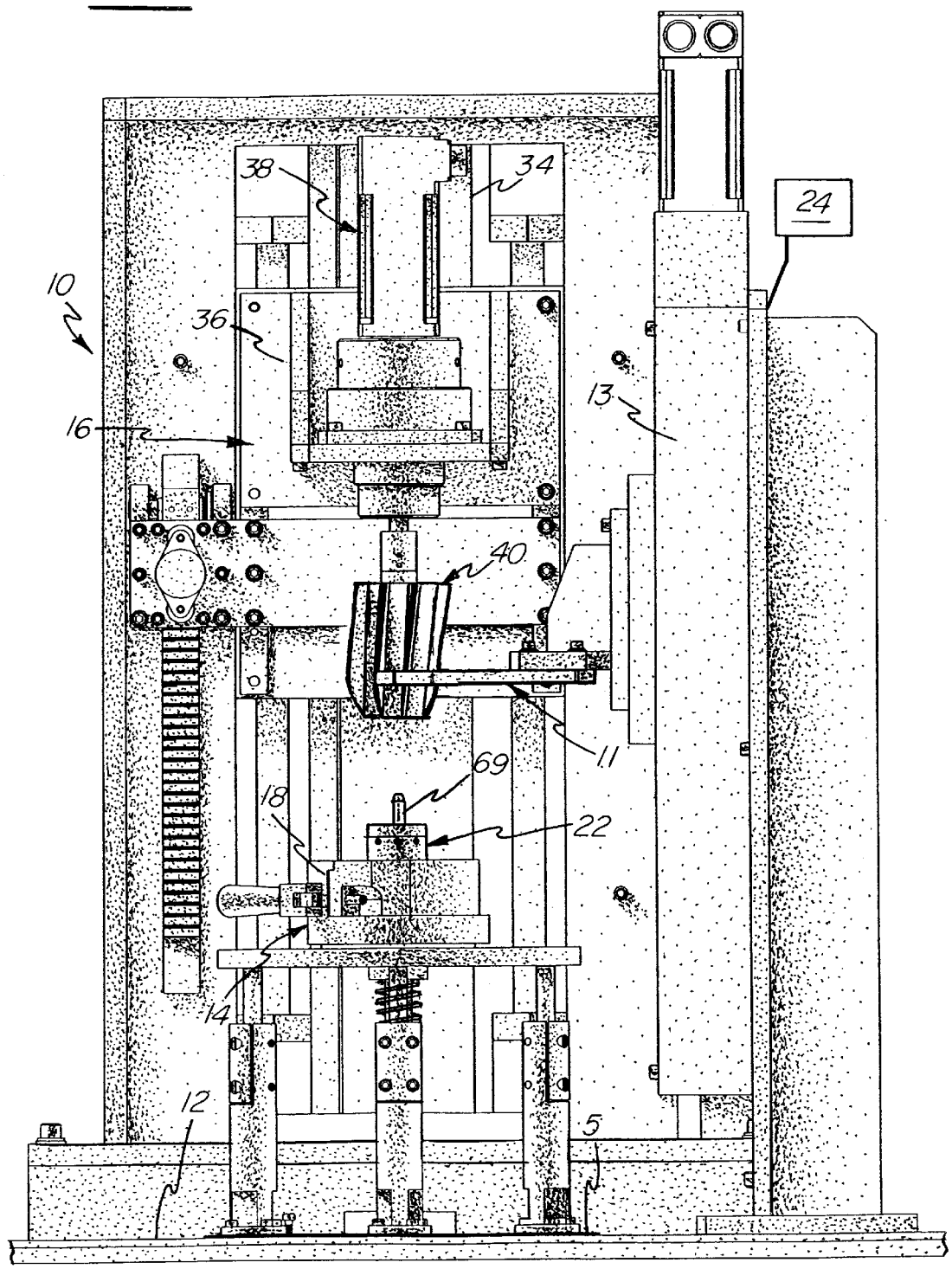
FIG. 1 is a front elevational view of the winding machine of the present invention.
Figure 2:
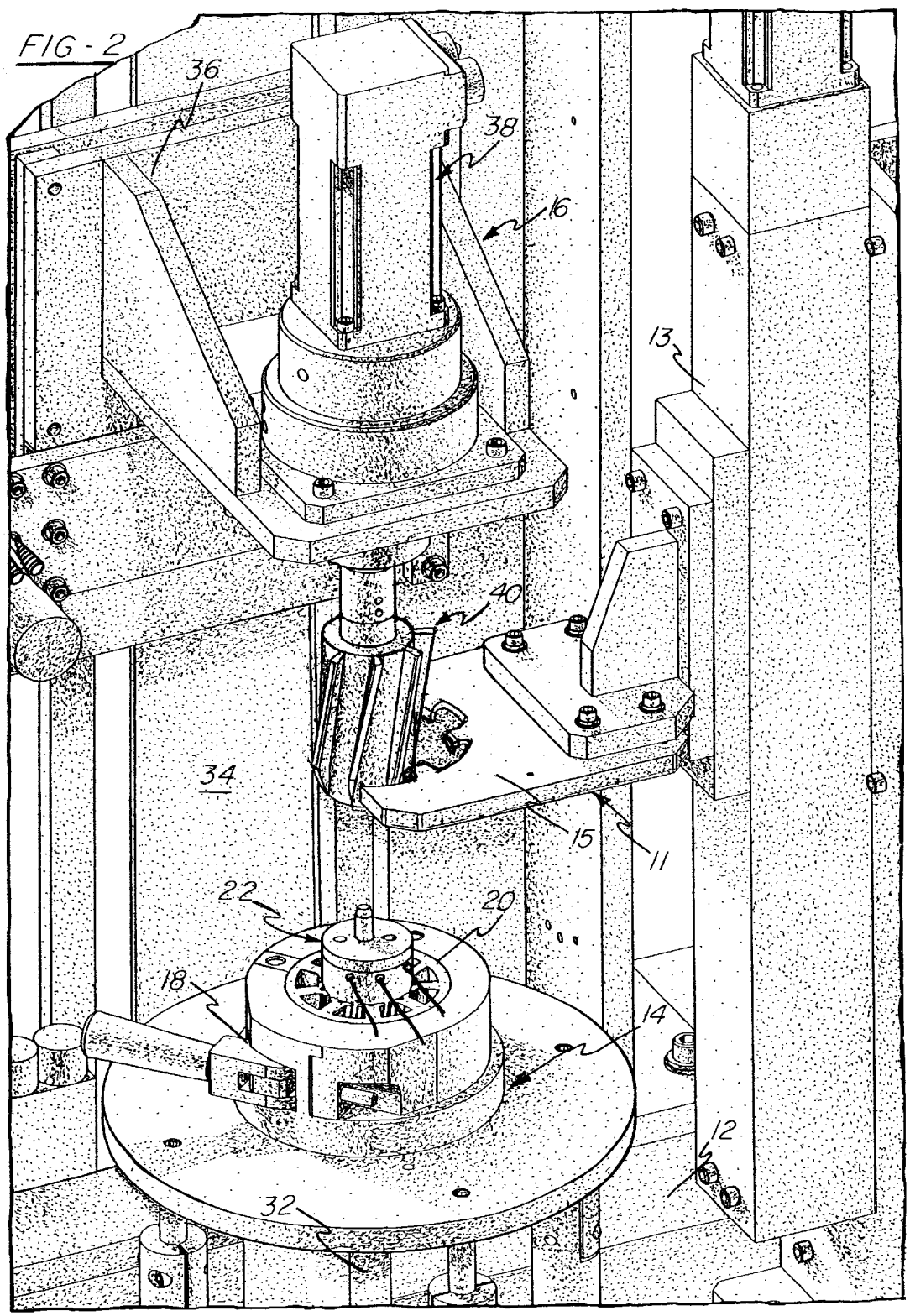
FIG. 2 is a perspective view of the winding machine of the present invention.

Referring to FIGS. 1 and 2, a winding machine 10 for performing the method of the present invention is illustrated. The winding machine 10 includes a table top 12 supporting a stator nest 14 and a drifting tool assembly 16. The stator nest 14 includes a clamp 18 for supporting a stator 20, and the stator nest 14 is supported for rotatable movement on a turntable 5 and actuated in rotation by a motor (not shown).

A winding spindle or winding tool 22 extends upwardly through the stator nest 14. The winding tool 22 is driven in reciprocating and oscillating or rotating movement by a drive mechanism located below the table 12. In addition, a programmable controller 24 is provided for controlling the winding operation.

The winding tool 22 is supported on a tool shaft 32 wherein the tool shaft 32 is formed as a hollow tubular member including a wire guide tube 74 (FIG. 15) therein for guiding insulated wire upwardly from a wire feed mechanism into the cylindrical portion of the winding tool 22 passing through the stator nest 14. The structure and operation of the winding machine 10 of the present invention is generally similar to that disclosed in U.S. Pat. No. 5,964,429, which patent is incorporated herein by reference, and it being understood that the present apparatus is an improvement over the apparatus disclosed in U.S. Pat. No. 5,964,429.

As seen in FIGS. 1 and 2, the drifting tool assembly 16 is connected to and operates under control of the controller 24, and includes a linear actuator 34 which may be in the form of a screw driven actuator or other linear actuator well known in the art to provide precise linear positioning of a drifting tool support member 36. The drifting tool support member 36 supports a servo motor driven actuator 38 connected in operable relationship to a drifting tool 40 for selectively rotating the drifting tool 40 during operation of the winding machine 10. It should be noted that the drifting tool 40 is supported independently of the winding tool 22 and is additionally rotatable independently from the winding tool 22. However, as will be understood further from the description given below, the movements of the longitudinal drifting tool 40 and winding tool 22 are synchronized with each other.

Figure 7:
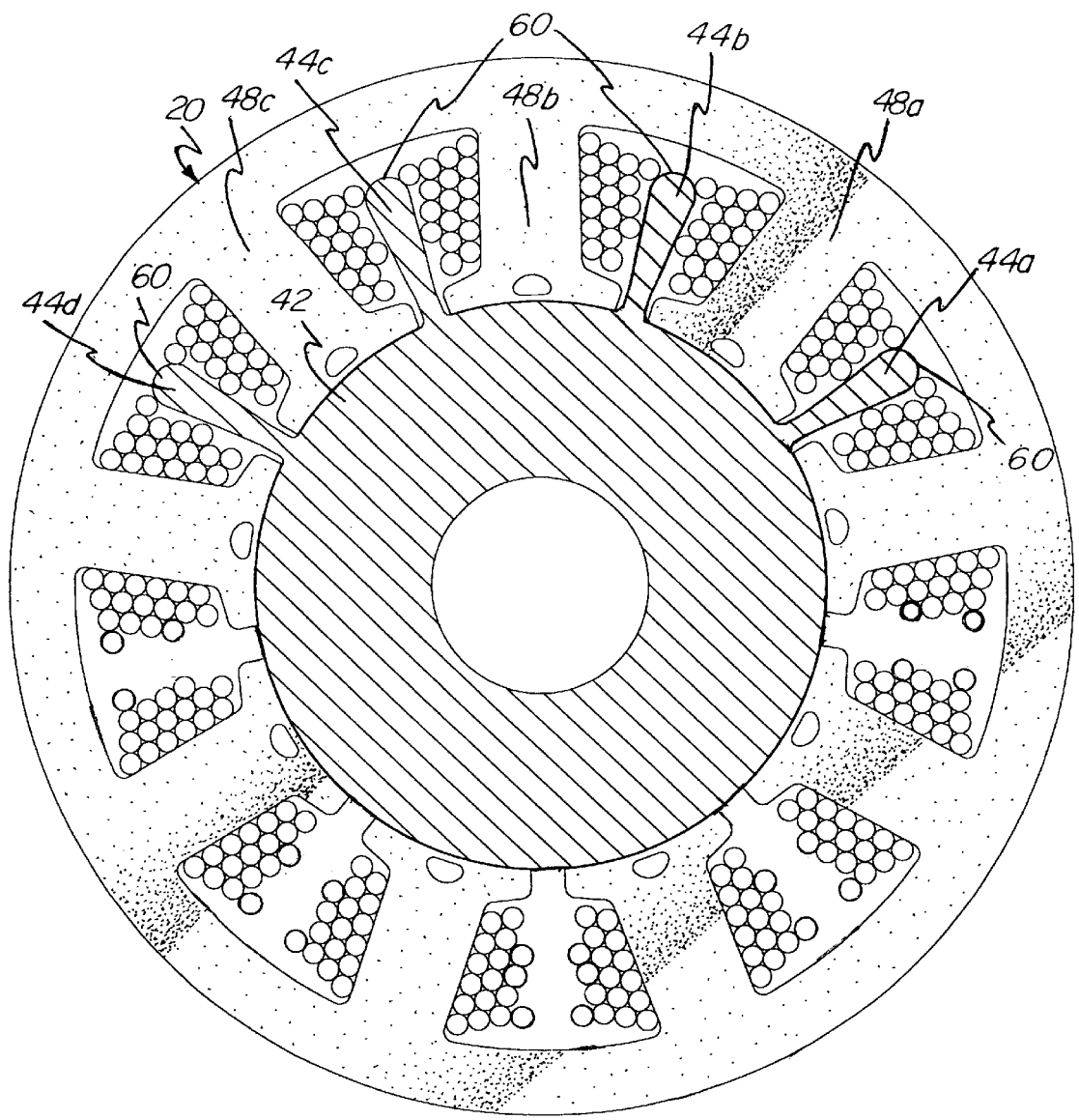
FIG. 7 is a top plan view showing the drifting tool positioned within a stator.

Referring further to FIGS. 3–6, the structure of the drifting tool 40 is shown in greater detail. The drifting tool 40 comprises a drifting tool body 42 defined by a cylindrical outer wall. In addition, a plurality of drifting blades 44 are supported on the drifting tool body 42, extending radially outwardly. The diameter of the drifting tool body 42 is preferably close to and slightly less than the diameter of the stator 20 to be wound. It can be seen that the drifting blades 44 extend longitudinally between opposing ends of the drifting tool body 42, and additionally extend at an angle relative to a longitudinal axis 46 of the drifting tool 40. The drifting tool 40 illustrated herein is configured to be used in conjunction with a stator having skewed slots, such as the stator disclosed in U.S. Pat. No. 5,964,429. In addition, the drifting blades 44 are configured to extend into the slots of the stator 20 whereby the drifting blades 44 will displace wire within the stator slots in a circumferential direction toward respective stator teeth 48 (FIG. 7). In this manner, the drifting blades 44 displace the wire within the stator slots to compactly form the wire therein and thereby ensure greater slot fill for the stator 20. In addition, the radial outer edges of the drifting blades 44 are operable to push the cross-over wires, extending between the wound coils, outwardly.

Figure 3:
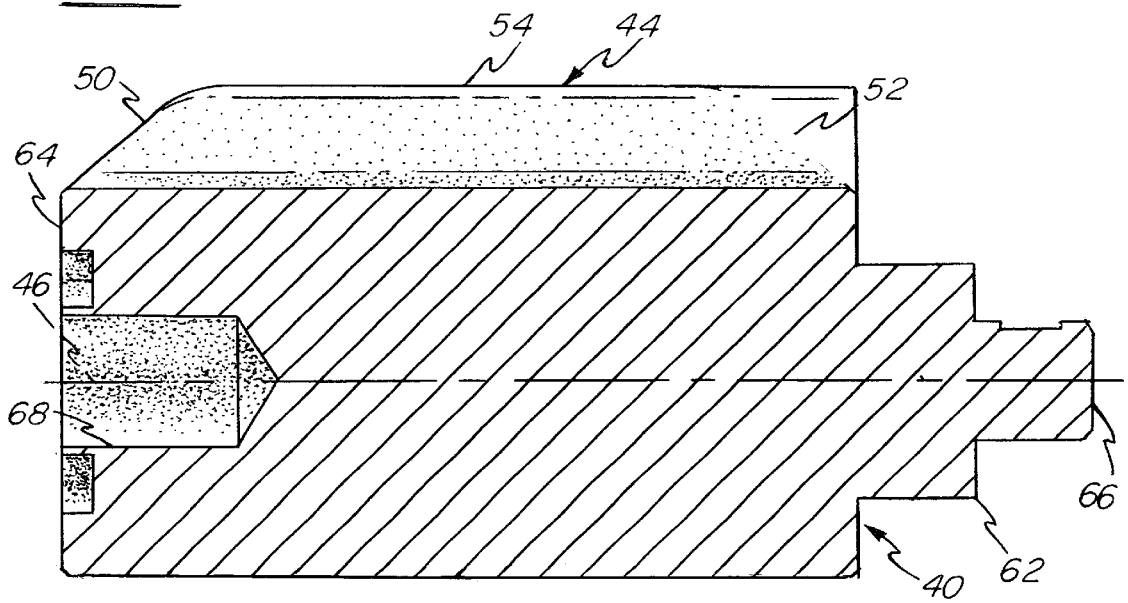
FIG. 3 is a cross-sectional view through the center of a drifting tool used in the winding machine.
Figure 4:
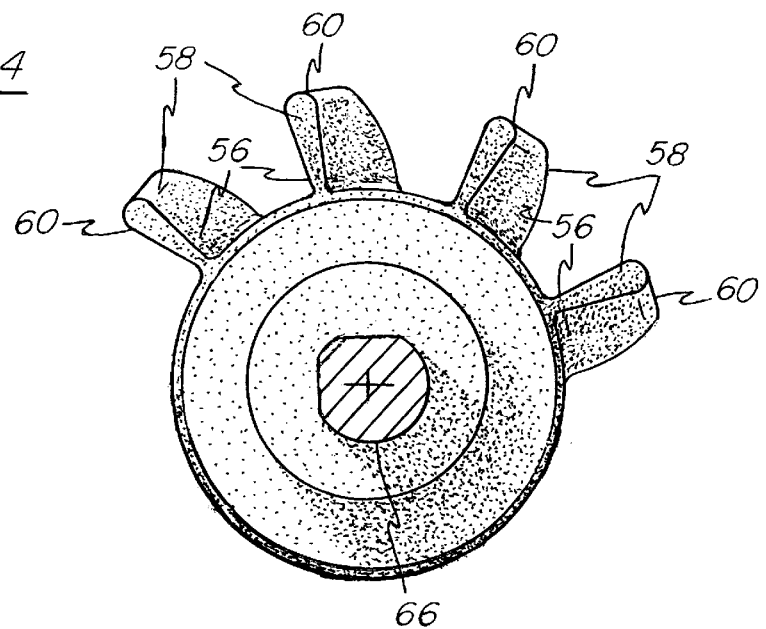
FIG. 4 is a top plan view of the drifting tool.

Referring to FIGS. 3 and 4, it can be seen that the drifting blades 44 are positioned around only a portion of the circumference of the drifting tool body 42 wherein the number of drifting blades 44 is related to the number of wires being fed from the winding tool 22 during the winding operation. In particular, the drifting tool 40 shown herein is configured to be used with a winding tool 22 which feeds three wires simultaneously into the slots of the stator 20. The drifting tool 40 is configured such that a drifting blade 44 is on either side of a stator tooth 48 as it is being wound with wire. Thus, as may be best seen with reference to FIG. 7, and assuming that three wires are being fed from the winding tool 22 to be wound around the teeth 48a, 48b, and 48c, it can be seen that the drifting blades 44a, 44b, 44c and 44d will be located on either side of each of these stator teeth being wound whereby the wires will be compacted toward these stator teeth.

The drifting blades 44 additionally operate on the cross-over wires formed when the stator 20 is rotated in the counterclockwise direction in preparation for the formation of a further set of wire coils on the stator 20. In particular, the outer edges 60 of the drifting blades 44 will operate to push the cross-over wires, extending across the end face of the stator 20, radially outwardly as the drifting tool 40 enters the stator 20 and the winding tool 22 operates to form a further set of wire coils on the stator teeth 48 at the new rotational position of the stator 20 relative to the winding tool 22.

It should be understood that although the above description of the drifting tool 40 refers to the provision of four drifting blades 44, a greater or fewer number of drifting blades 44 may be provided to produce a particular desired forming of the wire during the operation of producing compact or dense coils on the stator 20.

Referring to FIG. 3, each drifting blade 44 comprises first and second longitudinal end sections 50, 52, and the lower end section 50, i.e., that closest to the stator 20, angles radially outwardly from the drifting tool body 42 in a longitudinal direction toward a central section 54 located between the end sections 50, 52. The angled orientation of the end section 50 facilitates movement of the wire within the stator slots away from the drifting blade 44 as the drifting blade 44 reciprocates into the slots.

Referring to FIG. 4, the drifting blades 44 are formed with a base portion 56 located adjacent to the outer wall of the drifting tool body 42, and further include a drifting portion 58 located radially outwardly from the base portion 56. The base portion 56 includes a width dimension which is less than the width dimension of the drifting portion 58 whereby the base portion 56 is configured to pass through the opening defined at the radially inner ends of the stator teeth 48. Further, the drifting portion 58 tapers outwardly to a greater width at the radially outer ends of the drifting blades 44. In order to facilitate cooperation between the outer edges of the drifting blades 44 and the wires to move the wires circumferentially toward their respective stator teeth 48, and to provide a contoured contact edge for engaging the cross-over wires, the outer longitudinal edge 60 of the drifting blades is defined by an arcuate surface spanning between the radially extending, opposing faces defining the drifting portion 58.

The drifting tool 40 further includes opposing first and second ends 62, 64 (FIG. 3) wherein the first end 62 is adapted to mount to the actuator 38 for the drifting tool assembly 16. For this purpose, the first end 62 is formed with a non-circular connection portion 66 defining a non-rotatable connection with the actuator 38 to permit precise rotational positioning of the drifting tool 40 during operation of the winding machine 10. The opposing second end 64 of the drifting tool 40 is provided with an aperture 68 for cooperating with an outwardly extending alignment shaft 69 located on the winding tool 22 (FIG. 1).

It should be noted that the operation of the drifting tool 40 may be controlled in such a manner that provides for the most effective placement of the wire. In one embodiment of the invention, this includes maintaining the drifting tool 40 in spaced relation to the stator 20 while the winding tool 22 places a predetermined amount of wire around the stator teeth 48, after which time the drifting tool 40 is actuated to move simultaneously with the winding tool 22 to form the wire in the slots as the winding tool continues to wind additional wire onto the stator 20.

In a typical winding operation, the operation of the winding tool 22 of the present invention is similar to that described for U.S. Pat. No. 5,964,429. In particular, in the embodiment illustrated herein, the winding machine 10 is programmed at the controller 24 to drive the winding tool 22 in reciprocating and rotating movement for winding wire into a stator having skewed slots. Accordingly, as the winding tool 22 is moved in reciprocating movement, it is also rotated to maintain the wire apertures 106, 108, 110 (see FIG. 14) of the winding tool 22 in alignment with the slots.

Further, as the drifting tool 40 is reciprocated into and out of the stator 20, the drifting tool 40 is also rotated by its actuator 38 to follow the angled orientation of the stator slot. It should be understood that although the drifting tool 40 is capable of longitudinal and rotational movement with the winding tool 22 as the wire is placed within the stator slots, the drifting tool 40 and winding tool 22 are also independently rotatable, as is required when the winding tool 22 forms the end turns at either end of its reciprocating movement. Further, it should be noted that during the reciprocating movement of the winding tool 22 and drifting tool 40, the lower ends 50 of the drifting blades 44 are substantially longitudinally aligned with the apertures 106, 108, 110 of the winding tool 22.

Figure 11:
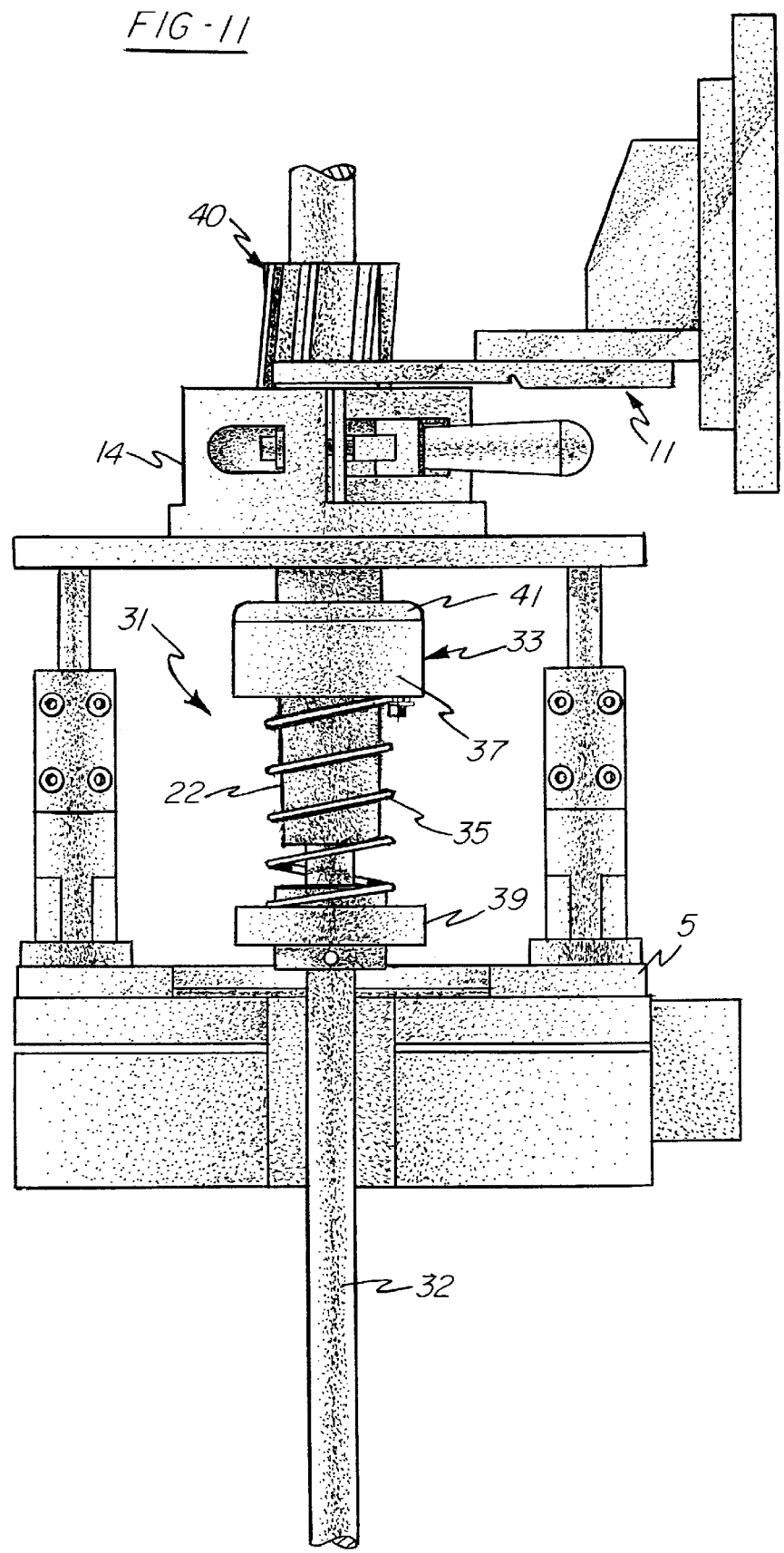
FIG. 11 is a side elevational view illustrating a bottom wire clamp and showing the drifting tool partially inserted in a stator during a winding operation.
Figure 12:
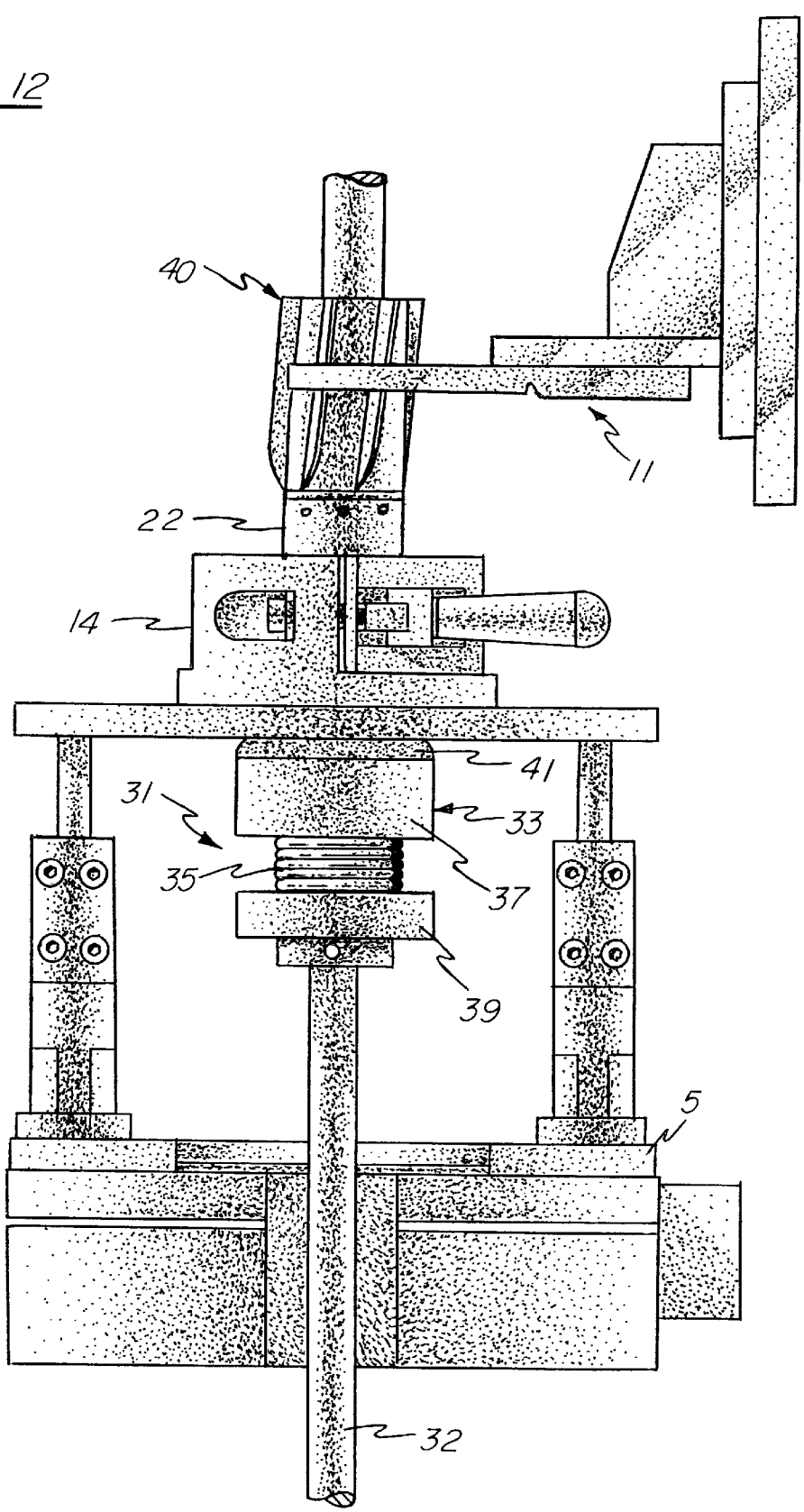
FIG. 12 is a side elevational view showing the bottom wire clamp in an alternative position to clamp wires on the bottom of a stator during a winding operation.

Referring to FIGS. 11 and 12, FIG. 11 illustrates the drifting tool 40 partially inserted through the stator 20 with the winding tool located at the bottom of its travel, and FIG. 12 illustrates an upper position of the winding tool 22 with the drifting tool 40 engaged on the upper end of the winding tool 22. With regard to the position of the drifting tool 40 illustrated in FIG. 11, it should be understood that the drifting tool 40 may be partially or fully inserted through the stator 20, and that the degree of insertion will depend on the wire forming requirements at different stages of the winding operation.

Referring further to FIGS. 1 and 2, the winding machine 10 further includes an upper wire clamp 11 which is supported for vertical movement on a linear actuator 13. The linear actuator 13 may be in the form of a screw driven linear actuator or other linear actuator for providing precise vertical movement of the upper wire clamp 11 under control of the controller 24.

Figure 8:
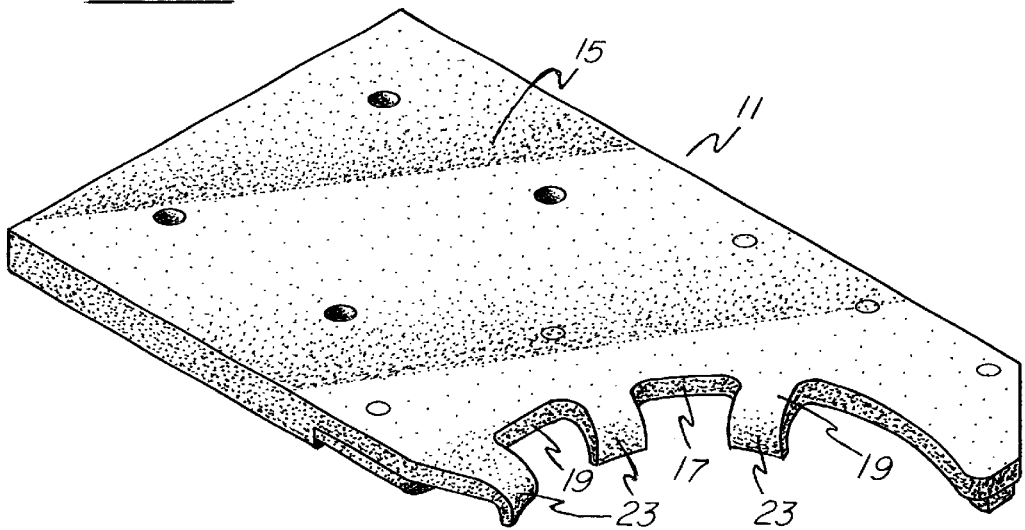
FIG. 8 is a top perspective view of an upper wire clamp for the winding machine.
Figure 9:
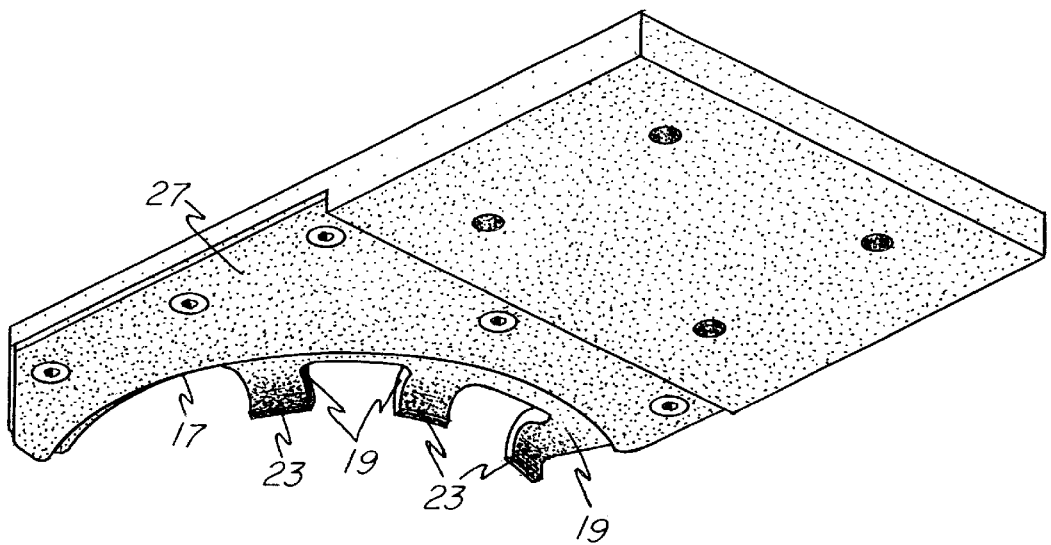
FIG. 9 is a bottom perspective view of the upper wire clamp.
Figure 10:
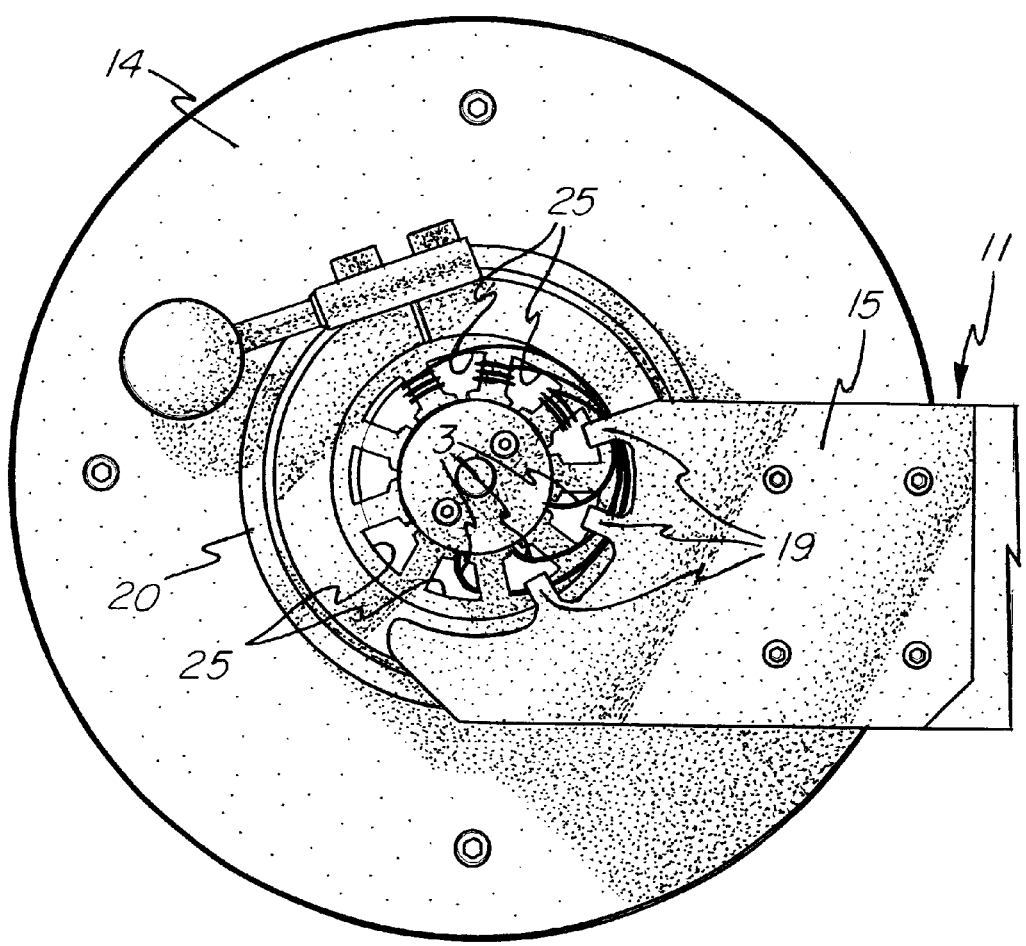
FIG. 10 is a top plan view showing the upper wire clamp in position on a stator for retaining crossover wires.

As seen in FIGS. 8, 9, and 10, the upper wire clamp 11 comprises a plate 15 that is formed with an arcuate edge 17, and a plurality of fingers 19 extending radially from the arcuate edge 17. The distal edges of the fingers 19 each include a downwardly extending tang 23. The plate 15 is supported on the actuator 13 with the fingers 19 extending radially inwardly from the inner, stator engaging surface of the stator nest 14 such that the tangs 23 are supported radially inwardly from the circumferential walls 25 of the stator slots.

The upper wire retainer 11 is adapted to move vertically toward and away from a stator 20 supported on the stator nest 14 to engage and retain the wire between the retainer 11 and the upper surface of the stator 20. In particular, cross-over wires 3 extending between coils will be engaged by the tangs 23 to retain the wires 3 from being pulled toward the center of the stator 20 during movement of the winding tool 22, after the stator 20 is rotated relative to the winding tool 22, and as additional coils of wire are wound around the teeth 48.

It should be noted that the lower side of the plate 15 includes a nylon portion 27 forming a contact surface for engagement of the plate 15 with the top of the stator 20 and/or wire lying along the top of the stator 20. Further, it should be understood that after rotation of the stator 20, forming the cross-over wires, and at some time subsequent to formation of additional coils of wire on the stator 20, the upper wire clamp 11 may be moved away from the stator 20 during a portion of the winding operation, if use of the upper wire clamp 11 is not considered necessary for retention of the cross-over wires during that portion of winding operations.

Referring to FIGS. 11 and 12, a lower wire clamp 31 is provided for engaging the wire coil end turns passing around the bottom of the teeth 48 of the stator 20. The lower wire clamp 31 is formed with substantially the same structure and operates in a manner similar to that disclosed in U.S. Pat. No. 6,206,319, which patent is incorporated herein by reference.

In particular, the lower wire clamp 31 includes a movable clamp member 33 which is formed with an inner diameter to receive the winding tool 22 in sliding engagement therethrough. The clamp member 33 is biased upwardly by a compression spring 35 which is supported on a fixed collar 39 rigidly attached to the tool shaft 32. In the preferred embodiment, the clamp member 33 includes an aluminum main body portion 37 and an upper, wire engaging, hardened and polished steel cap ring 41.

In operation, the clamp member 33 is moved into engagement with end turn wires on the bottom of the stator 20 as the winding tool 22 moves upwardly in order to maintain the end turns in position and prevent them from shifting radially inwardly toward the center of the stator 20. When the winding tool 22 moves downwardly, the clamp member 33 is moved away from the stator 20 to thereby provide a clearance for the winding tool 22 to apply additional end turns of wire across the lower surfaces of the teeth 48.

Referring to FIGS. 13, 14, 15, and 16, the winding tool 22 comprises a winding tool base 70, including a main wire passage aperture 72 located adjacent a diametric side of the winding tool base 70 at a longitudinal end thereof. The winding tool base 70 is supported on the tool shaft 32 for driving the winding tool 22 in reciprocating and rotational movement. A wire guide tube 74 extends through the tool shaft 32 and into the winding tool base 70 for guiding a plurality of wires W up to the main wire passage aperture 72.

The winding tool 22 further includes a wire guide base 76 supported on the longitudinal end 78 of the winding tool base 70, and a wire guide cap 80 which is supported on the wire guide base 76. A cylindrical sleeve 82 surrounds the wire guide base 76 and a lower portion 84 of the wire guide cap 80 and is seated on a groove 86 formed adjacent and surrounding the longitudinal end 78 of the winding tool base 70.

The wire guide base 76 includes a guide surface 88 which transitions from an interface portion 90 located adjacent the main wire passage aperture 72 and extending generally parallel to the longitudinal axis 46, and a transition portion 92 which is formed as an arcuate surface bending to an orientation which is generally perpendicular to the longitudinal axis 46 at a diametrical edge opposite from the diametrical edge of the interface portion 90.

The transition portion 92 includes a plurality of grooves 94, 96, 98 wherein the grooves 94, 96, 98 define branch passages for guiding individual wires passing through the main wire passage aperture 72. The branch passages defined by the grooves 94, 96, 98 diverge away from each other in a direction away from the interface portion 90 of the wire guide base 76, and are separated from each other by passage walls 100, 102. The passage walls 100, 102 taper to thin edges at the interface portion 90 such that the interface walls 100, 102 have a thickness which is less than the width of the grooves 94, 96, 98 whereby the ends of wire passing from the main wire passage aperture 72 into the interface portion 90 will be selectively directed into only one of the branch passages defined by the grooves 94, 96, 98. In this manner, the winding tool 22 has a self-threading feature which provides for directing a plurality of wires into individual passages of the winding tool 22. To this end, the wire guide cap 80 provides a cover for the interface portion 90 and the grooves 94, 96, 98 wherein the lower portion 84 of the wire guide cap 80 includes a contact surface 104 for defining closed passages for the wire passing into the grooves 94, 96, 98.

The sleeve 82 defines three apertures 106, 108, 110 which correspond to and are aligned with the branch passages defined by the grooves 94, 96, 98, and define the exit apertures for feeding wire to the stator supported in the stator nest 14.

Figure 15:
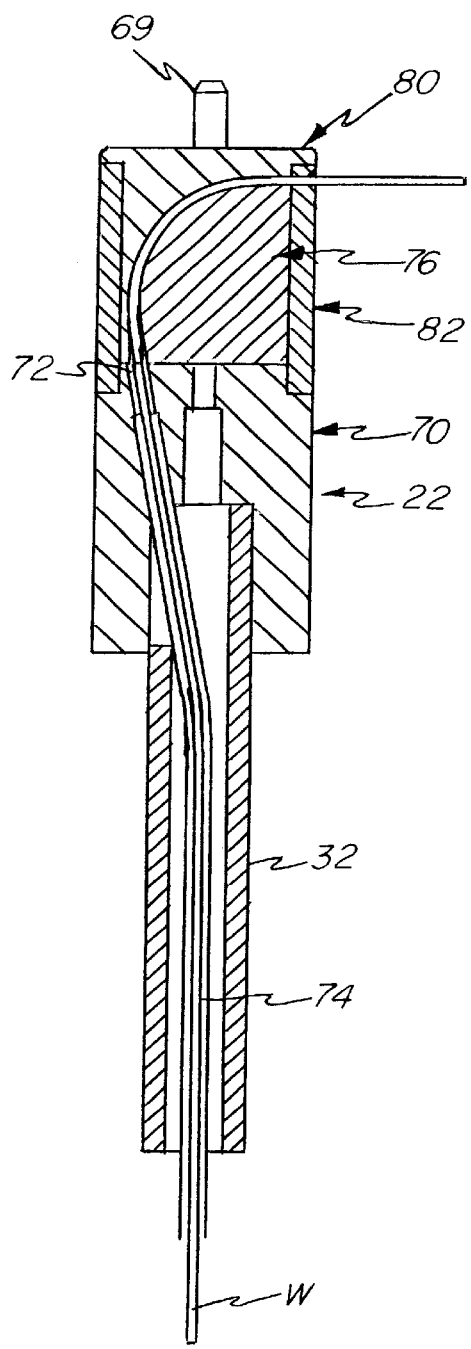
FIG. 15 is a cross-sectional view through the winding tool.
Figure 16:
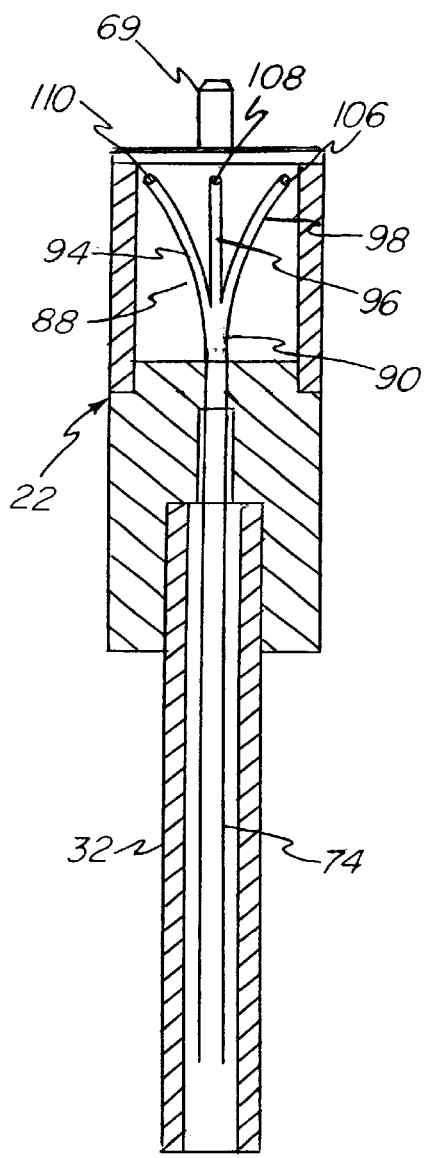
FIG. 16 is a cross-sectional view, taken at 90° relative to FIG. 15, through the winding tool.
Figure 17:
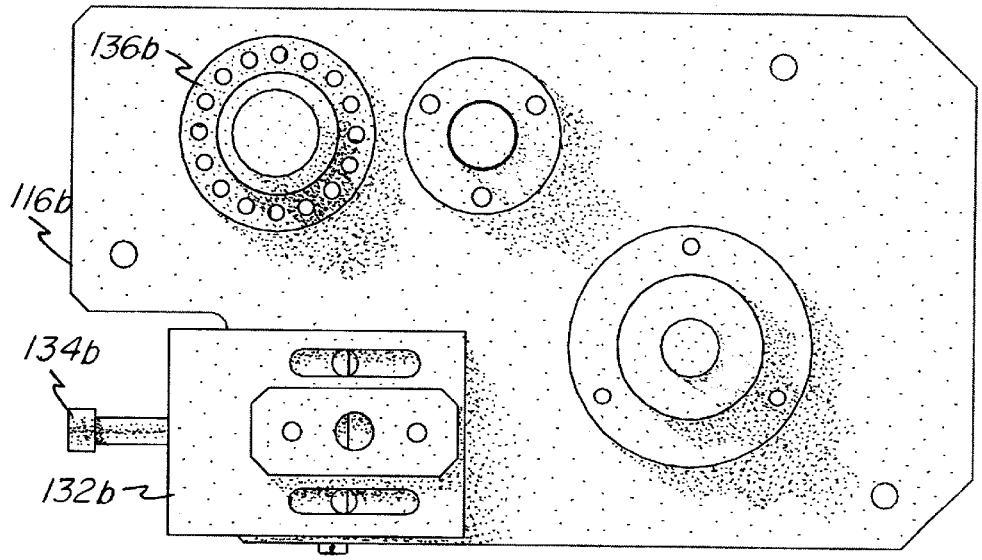
FIG. 17 is a plan view of a top plate of the wire feed mechanism for the winding machine.
Figure 18:
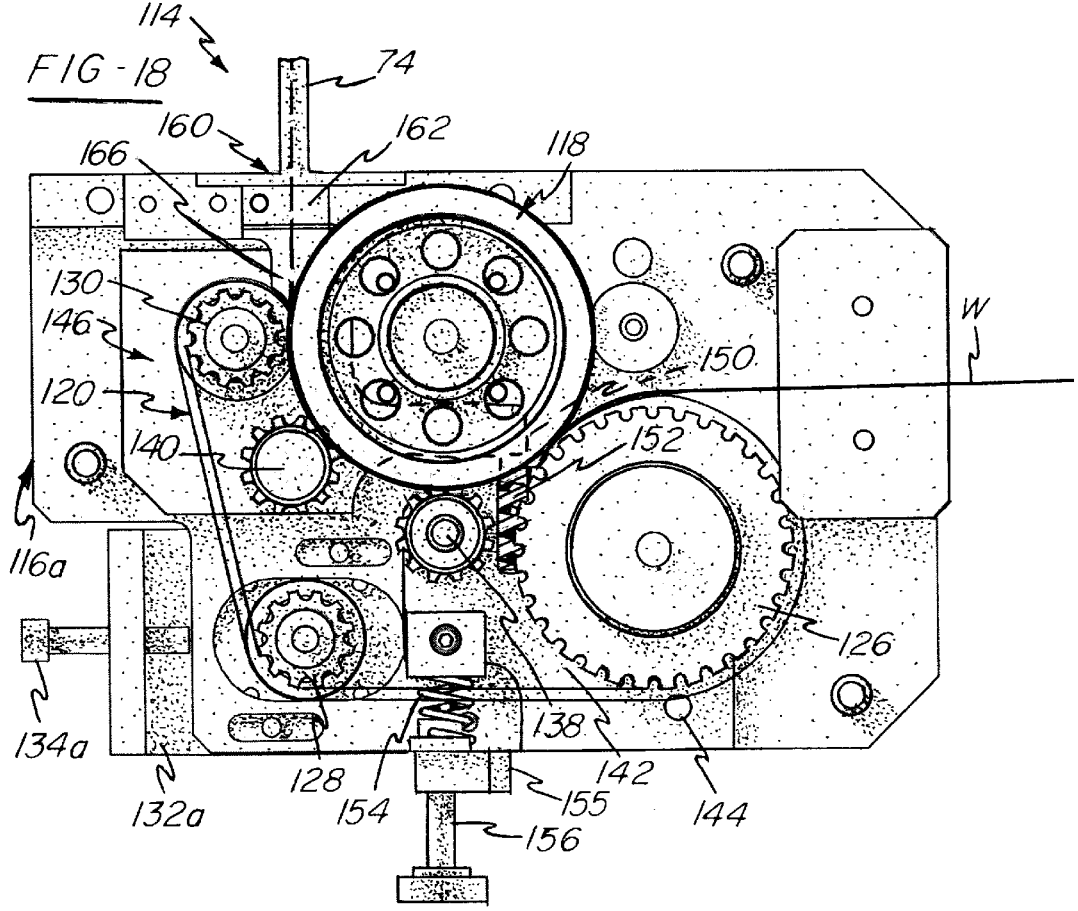
FIG. 18 is a plan view of the bottom plate of the wire feed mechanism for the winding machine.
Figure 19:
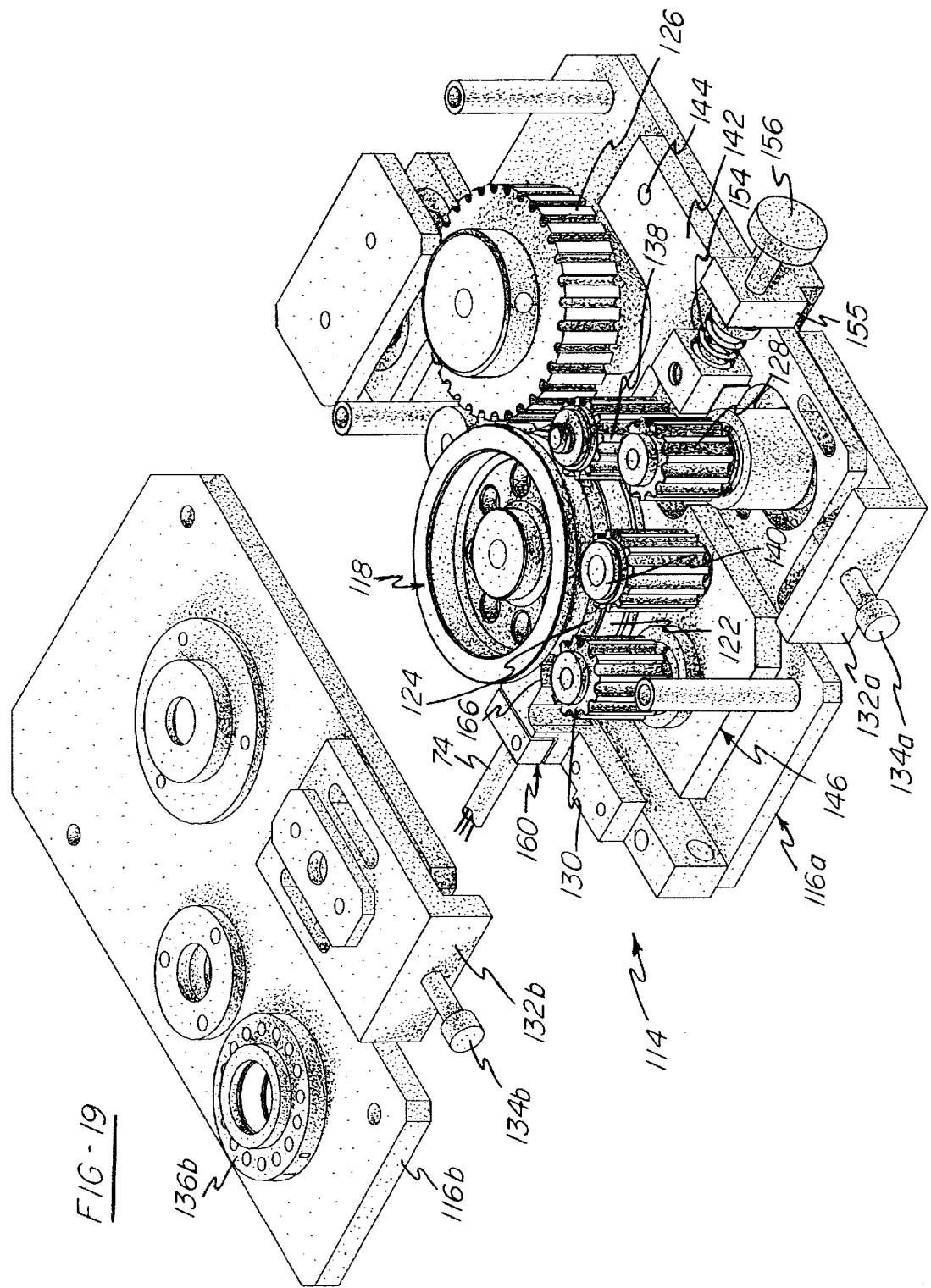
FIG. 19 is a partially exploded, perspective view of the wire feed mechanism with the belt removed.
Figure 20:
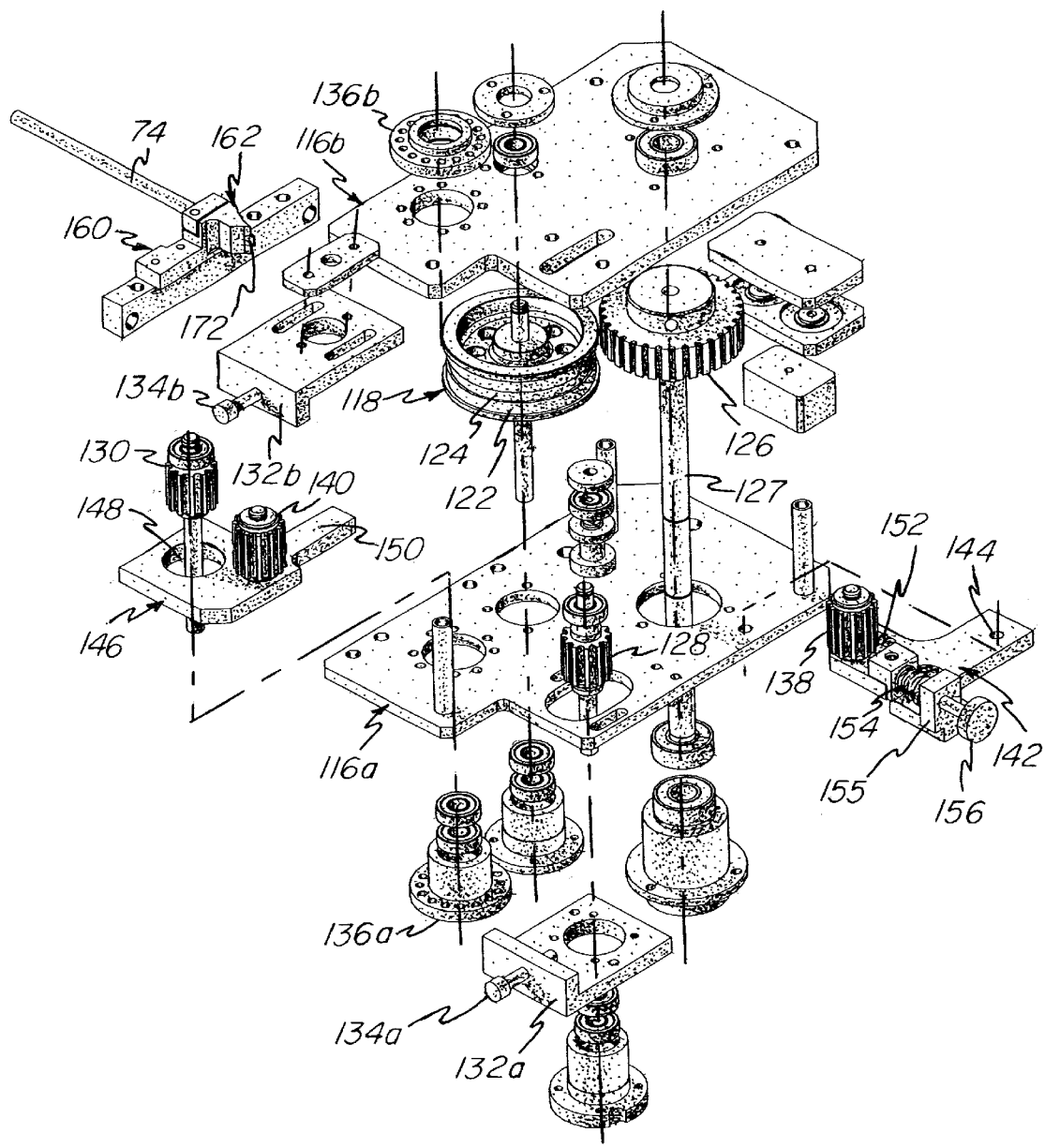
FIG. 20 is an exploded view of the wire feed mechanism.
Figure 21:
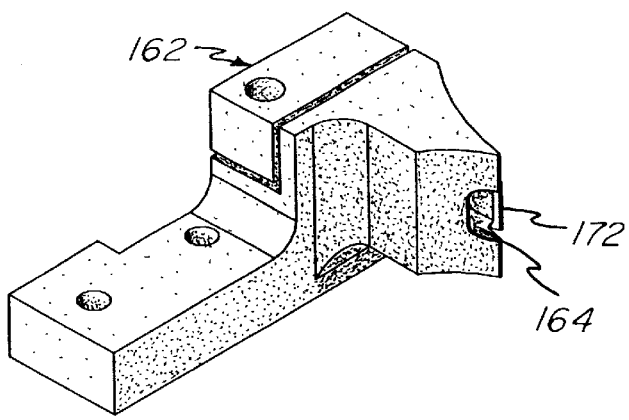
FIG. 21 is a perspective view of a wire guide member for the wire feed mechanism.
Figure 22:
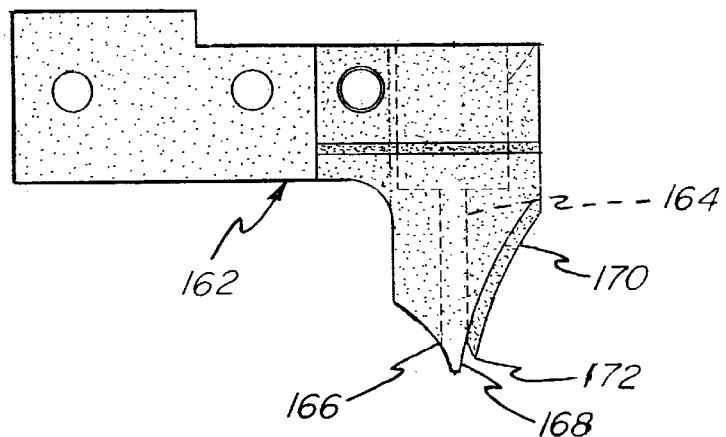
FIG. 22 is a side-elevational view of the wire guide member.
Figure 23:
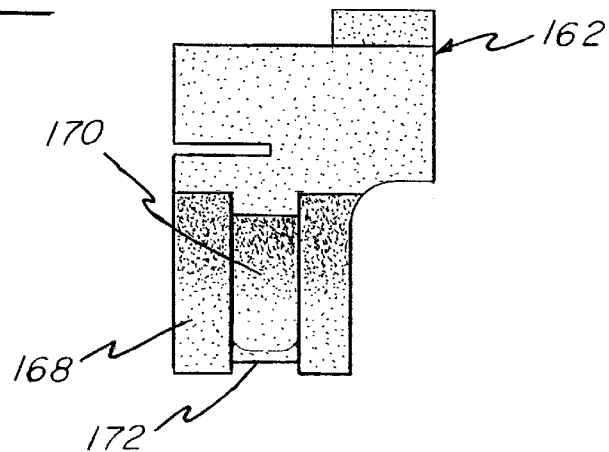
FIG. 23 is an end view of the wire guide member.

It should be noted that an upper portion 112 of the wire guide cap 80 is formed as a circular member cooperating with the circular upper surface of the sleeve 82 to define an upper surface of the winding tool 22. Further, the upper portion 112 of the wire guide cap 80 supports the alignment shaft 69 for engagement with the alignment aperture 68 of the drifting tool 40 whereby the drifting tool 40 and winding tool 22 are aligned longitudinally along the axis 46 during reciprocating movement of the winding tool 22 and drifting tool 40. It should be understood that the present invention is particularly designed to accommodate larger gauge wire, such as 15 gauge wire for winding onto the teeth of the stator 20. Handling of such wire must avoid sharp bends in order to avoid cold working of the wire, as well as kinking. Accordingly, as seen in FIG. 15, the wire passes up through the tool shaft 32, centrally of the winding tool 22, and then passes to one diametrical side of the winding tool 22 before being directed through a gentle arcuate curve to the opposing diametric side for exiting and winding into the stator 20. In this manner the wire is directed through gentle curves from a direction extending longitudinally of the winding tool 22 to a direction transverse to the longitudinal axis 46.

Referring to FIGS. 17–24, a wire feed mechanism 114 is illustrated, and is particularly configured to handle feeding of large diameter wire, such as is intended for use with the present invention. It should further be noted that the wire feed mechanism 114 is configured to feed a plurality of wires simultaneously, and is described herein as simultaneously feeding three wires.

The wire feed mechanism 114 comprises wire feed plates 116a, 116b, and a wire drive pulley 118 supported by the feed plates 116a, 116b and located in engagement with a wire drive belt 120. The wire drive pulley 118 includes a belt receiving groove 122 (FIG. 20) within which is located a wire guide groove 124 for receiving and guiding wire around the circumference of the wire drive pulley 118.

Figure 24:
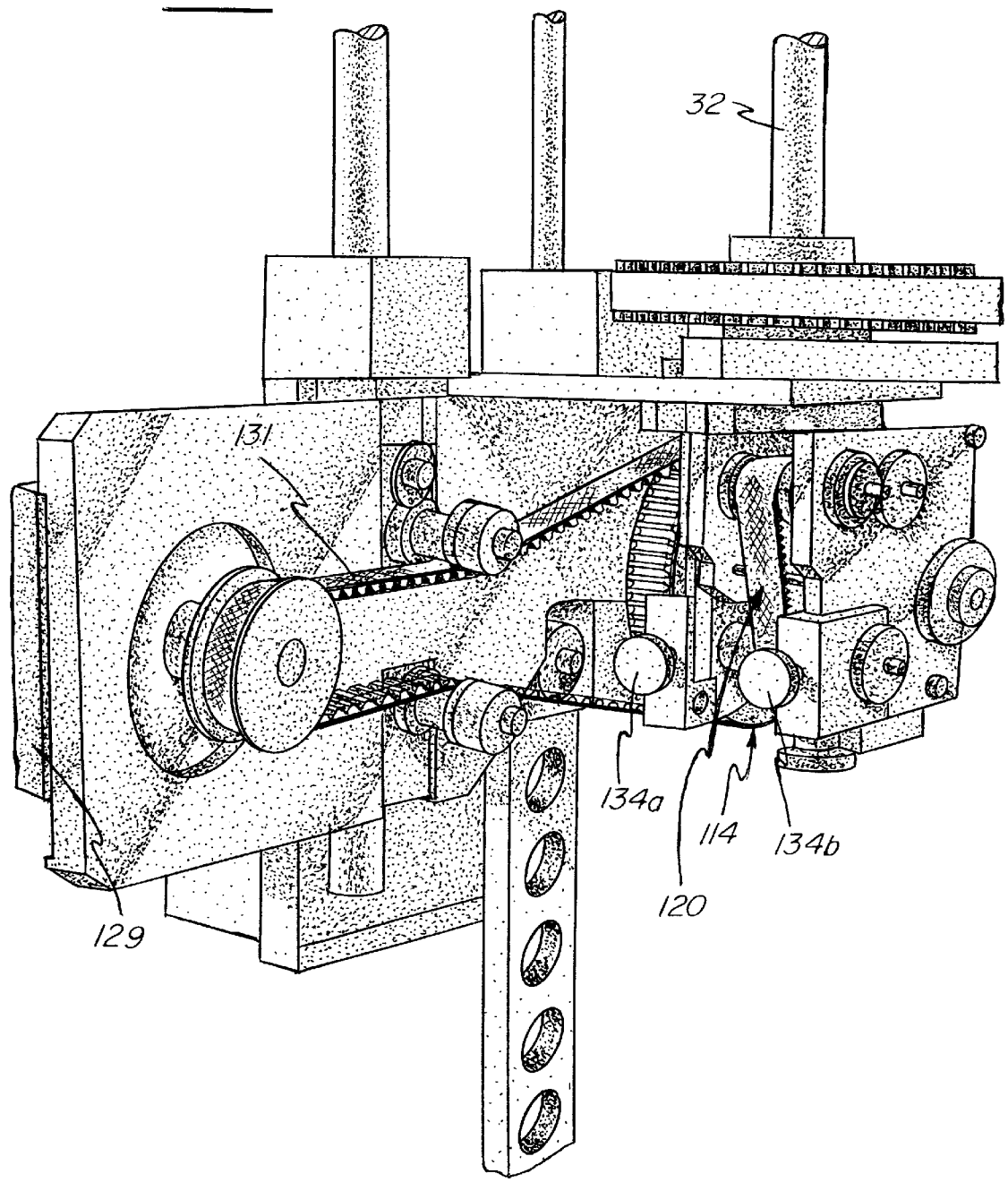
FIG. 24 is a perspective view of the wire feed mechanism including a drive belt for driving the wire feed mechanism.

The belt 120 is guided around a belt drive pulley 126 and belt tension pulleys 128, 130. The belt drive pulley 126 is supported on a shaft 127 (FIG. 20) driven by a motor 129 via belt 131 (FIG. 24). The belt tension pulley 128 is supported on the feed plates 116a, 116b for linear movement by slide plates 132a, 132b wherein the position of the side plates 132a. 132b relative to the feed plates 116a, 116b is adjustable by means of adjustment screws 134a, 134b.

The pulley 130 is adjustable relative to the wire drive pulley 118 and is mounted by eccentric bearings 136a and 136b (FIG. 20) to the feed plates 116a, 116b. Thus, the position of the pulley 130 relative to the feed plates 116a, 116b and the wire drive pulley 118 may be adjusted by rotating the mounting position of the bearings 136a, 136b relative to the feed plates 116a, 116b.

Additional pulleys 138 and 140 are provided positioned adjacent to the circumference of the wire drive pulley 118 for engagement against the belt 120 to thereby press the belt 120 against the wire drive pulley 118. The pulley 138 is mounted to a first tensioner plate 142 mounted to the feed plate 116a for pivotal movement at a pivot connection 144. The pulley 140 is supported on a second tensioner plate 146 which is mounted for pivotal movement relative to the feed plate 116a at an aperture 148 concentric with and centered by the bearing 136a for the belt tensioning pulley 130.

The second tensioner plate 146 includes a tongue portion 150 which is engaged by a tensioning spring 152 biased against a surface of the first tensioner plate 142 whereby the pulley 140 is biased toward engagement with the wire feed pulley 118. In addition, the first tensioner plate 142 is biased by a tensioning spring 154 to pivot the pulley 138 toward engagement with the wire feed pulley 118. An adjustment screw 156, which is mounted in a bracket 155 supported to the wire feed plate 116a, is engaged with an end of the tensioning spring 154 whereby the biasing force applied against the first tensioner plate 142 may be adjusted. It should be noted that as the tension against the first feed plate 142 is adjusted, the biasing force applied from the first feed plate 142 to the tongue portion 150 of the second feed plate 146 is also adjusted in that any adjustment movement of the pulley 138 toward or away from the wire feed pulley 118 will result in a simultaneous movement of the pulley 140 relative to the wire feed pulley 118.

The wire feed mechanism 114 further includes a wire exit member 160 for directing wire from the wire feed pulley 118 to the tool shaft 32 supporting the winding tool 22. The wire exit member 160 includes a wire guide 162 (see FIGS. 21–23) comprising a wire guide aperture 164 therethrough. The wire guide aperture 162 includes an entry end 166 adjacent a first surface 168 which is positioned in association with the belt groove 122 of the wire guide pulley 118. A second surface 170 is spaced from the first surface 168 and is adapted to extend into the wire guide groove 124 of the wire drive pulley 118. The second surface 170 terminates in a wire pick-up lip 172 wherein the pick-up lip is adapted to engage the leading end of wire located within the wire guide groove 124 and thereby direct the wire into the aperture 164. Thus, the wire exit member 160 provides for self threading of the wire into the wire guide tube 74 extending through the tool shaft 32.

It should be noted that the wire feed mechanism 114 is particularly designed for conveying thicker gauge wire, and therefore provides a plurality of pulleys for tensioning and providing guiding forces against the belt 120 and wire drive pulley 118. It should also be understood that the wire feed mechanism 114 is mounted for movement with the tool shaft 32 in a manner similar to that disclosed in U.S. Pat. No. 5,964,429 whereby the wire feed mechanism 114 moves in reciprocating movement with the reciprocating movement of the winding tool 22.

Further, it should be understood from the above description, that wire is initially fed into the nip between the belt 120 and the wire feed pulley 118 adjacent the belt drive pulley 126, and is thereafter self feeding through the machine until it exits the apertures 106, 108, 110 on the outer circumference of the winding tool 22.

While the form of apparatus herein described constitutes a preferred embodiment of this invention, it is to be understood that the invention is not limited to this precise form of apparatus, and that changes may be made therein without departing from the scope of the invention which is defined in the appended claims.

What is claimed is:

1. An apparatus for forming field coils on a stator for a dynamo-electric machine, said stator including a plurality of slots defined by stator teeth, said apparatus comprising:

a stator mount for supporting a stator;

a winding tool defining a longitudinal axis and supported for reciprocating movement relative to said stator mount, said winding tool including a wire feed passage for feeding wire into slots of the stator supported by the stator mount;

a wire feed mechanism for feeding wire to said winding tool;

said wire feed passage comprising an upstream, main passage for guiding a plurality of wires and a plurality of downstream branch passages, each branch passage for guiding a single wire; and wherein said branch passages are separated from each other by passage walls, said passage walls having a thickness, at a location adjacent to said main passage, which is less than the width of said branch passages.

2. The apparatus of claim 1 wherein said winding tool is cylindrical and said wire passage extends from one side of said winding tool, where said winding tool receives said wire from said wire feed mechanism, to a diametrically opposite side of said winding tool, where wire feed apertures associated with said wire passage are located for feeding wire from said winding tool.

3. The apparatus of claim 1 wherein said winding tool comprises a wire guide base and a wire guide cap, the wire guide base including grooves formed along an exposed surface thereof, and the wire guide cap including a contact surface defining a contour to match a contour of the exposed surface, said contact surface contacting said exposed surface and covering said grooves to thereby define said branch passages.

4. The apparatus of claim 3 including a winding tool sleeve positioned around said wire guide base and said wire guide cap, said sleeve defining a plurality of wire apertures, each wire aperture associated with each of said branch passages for feeding wires from said winding tool.

5. The apparatus of claim 1 further including a drifting tool, said drifting tool being positioned in alignment with an upper end of said winding tool, and said drifting tool and said winding tool including cooperating elements for engagement with each other to facilitate alignment between said drifting tool and said winding tool.

6. The apparatus of claim 1 including a wire feed plate for feeding wire to said winding tool, said wire feed plate comprising a drive belt and a wire drive pulley in engagement with said drive belt, said wire drive pulley including a groove for receiving wire therein to thereby maintain the wire in engagement with a predetermined portion of an outer surface of said wire drive pulley.

7. The apparatus of claim 6 wherein said wire feed plate comprises a wire exit member including a wire pick-up lip extending into said groove for engaging wire located in said groove and directing the wire toward said main passage of said wire feed passage.

8. The apparatus of claim 6 including a first tensioner pulley engaged with said drive belt, and a second tensioner pulley engaged with said drive belt, a first tensioner plate mounting said first tensioner pulley, a second tensioner plate mounting said second tensioner pulley, and a support plate pivotally supporting said each of said first tensioner plate and said second tensioner plate.

9. The apparatus of claim 8 wherein said first tensioner plate engages against said second tensioner plate, and including an adjustment mechanism engaged with said first tensioner plate to move said first tensioner plate, resulting in simultaneous movement of said second tensioner plate, to thereby adjust the tension on said drive belt.

10. An apparatus for forming field coils on a stator for a dynamo-electric machine, said stator including a plurality of slots defined by stator teeth, said apparatus comprising:
   a stator mount for supporting a stator;
   a winding tool defining a longitudinal axis and supported for reciprocating movement relative to said stator mount, said winding tool including a wire feed passage for feeding wire into slots of the stator supported by the stator mount;
   a wire feed mechanism for feeding wire to said wire feed passage, said wire feed mechanism comprising a wire feed plate including a drive belt and a wire drive pulley in engagement with said drive belt, said wire drive pulley including a groove for receiving wire therein to thereby maintain the wire in engagement with a predetermined portion of an outer surface of said wire drive pulley; and
   said wire feed mechanism further comprising a wire exit member including a wire pick-up lip extending into said groove or engaging wire located in said groove and directing the wire toward said wire feed passage whereby a leading end of wire located in said groove will be diverted from said groove to said wire feed passage.

11. The apparatus of claim 10 including a first tensioner pulley engaged with said drive belt, and a second tensioner pulley engaged with said drive belt, a first tensioner plate mounting said first tensioner pulley, a second tensioner plate mounting said second tensioner pulley, and a support plate pivotally supporting said each of said first tensioner plate and said second tensioner plate.

12. The apparatus of claim 11 wherein said first tensioner plate engages against said second tensioner plate, and including an adjustment mechanism engaged with said first tensioner plate to move said first tensioner plate, resulting in simultaneous movement of said second tensioner plate, to thereby adjust the tension on said drive belt.

13. The apparatus of claim 10 wherein said wire feed passage comprises a main passage for guiding plurality of wires and a plurality of branch passages defined within said winding tool and connected to said main passage, and wherein said branch passages are separated from each other by passage walls, said passage walls having a thickness, at an interface between said main passage and said branch passages, which is less than the width of said branch passages whereby the leading end of a single wire will be directed from said main passage to each of said branch passages.

14. An apparatus for forming field coils on a stator for a dynamo-electric machine, said stator including a plurality of slots defined by stator teeth, said apparatus comprising:
   a stator mount for supporting a stator;
   a winding tool defining a longitudinal axis and supported for reciprocating movement relative to said stator mount, said winding tool including a wire feed passage for feeding wire into slots of a stator supported in said stator mount; and
   an upper wire retainer supported for movement toward an end of the stator for engaging cross-over wires extending across the end of the stator.

15. The apparatus of claim 14 wherein said upper wire retainer is supported for movement independently of said winding tool.

16. The apparatus of claim 14 wherein said upper wire retainer comprises at least one finger extending radially toward said longitudinal axis.

17. The apparatus of claim 16 wherein said at least one finger includes an end with a tang extending substantially perpendicular therefrom.

18. The apparatus of claim 16 including a plurality of fingers extending toward said longitudinal axis.

19. The apparatus of claim 8 wherein said fingers each terminate in an end located to extend radially over a portion of a slot of the stator.

20. The apparatus of claim 18 wherein said upper wire retainer comprises a plate supporting said fingers.

* * * * *